UNITED STATES PATENT OFFICE.

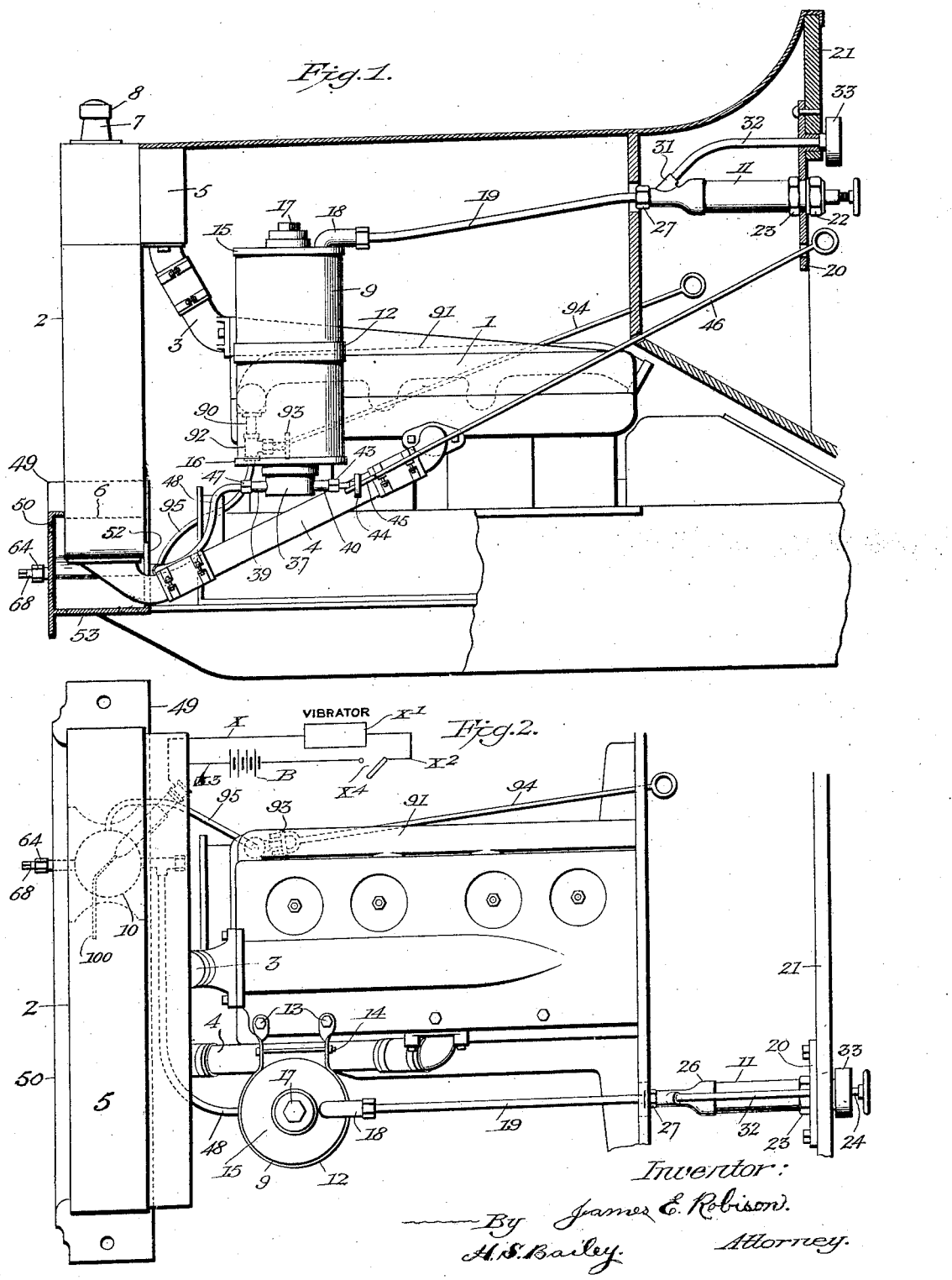

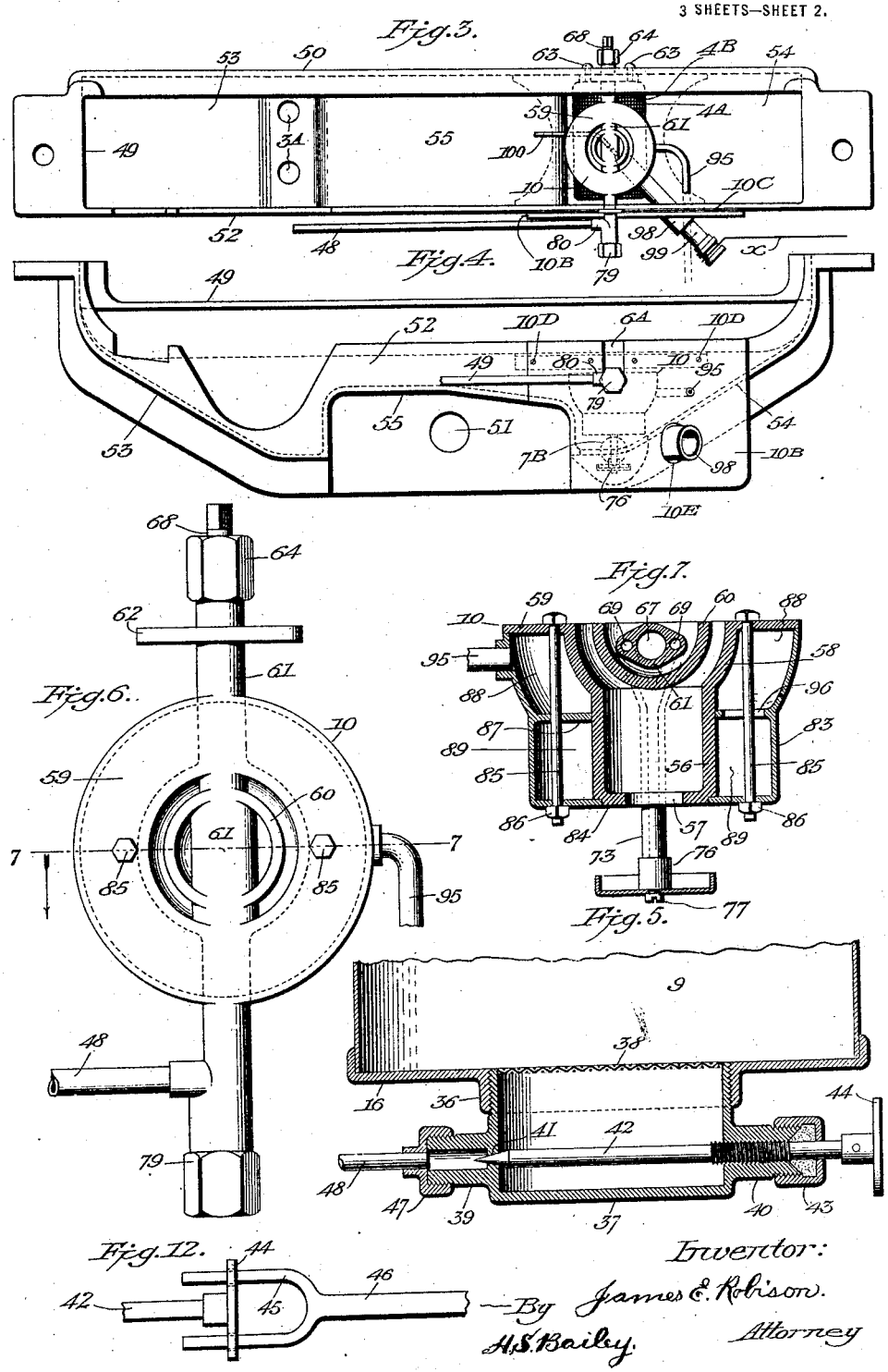

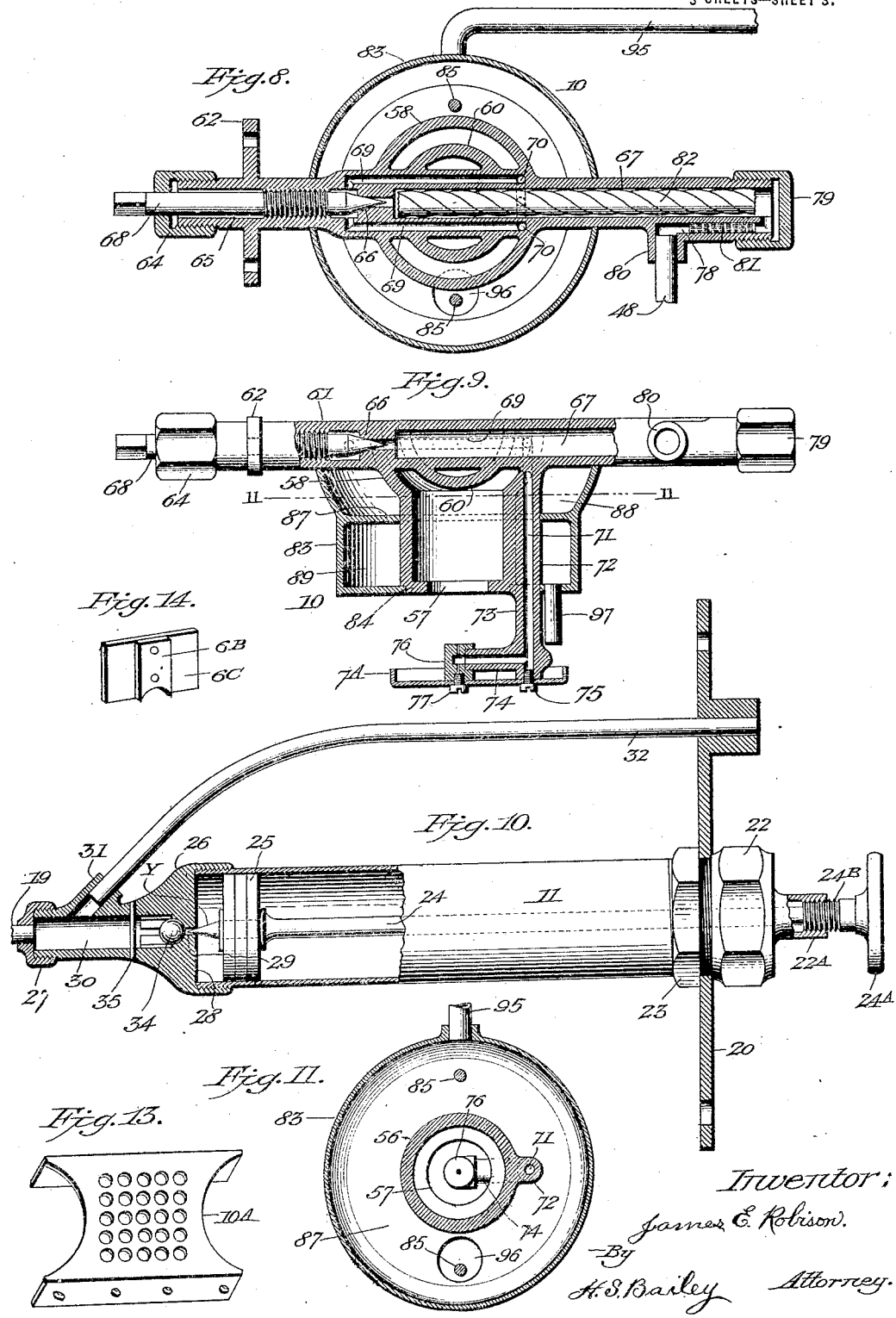

JAMES E. ROBISON, OF DENVER, COLORADO.

WATER-HEATING APPARATUS FOR RADIATOR-PROVIDED WATER-COOLED INTERNAL-COMBUSTION ENGINES OF AUTOMOBILES AND OTHER VEHICLES.

1,411,379.        Specification of Letters Patent.        Patented Apr. 4, 1922.

Application filed November 23, 1920. Serial No. 426,048.

*To all whom it may concern:*

Be it known that I, JAMES E. ROBISON, a citizen of the United States of America, residing at the city and county of Denver and State of Colorado, have invented a new and useful Water-Heating Apparatus for Radiator-Provided Water-Cooled Internal-Combustion Engines of Automobiles and other Vehicles, of which the following is a specification.

My invention relates to a new and improved water heating apparatus for radiator provided water-cooled internal-combustion engines of automobile cars, trucks, boats and flying machines.

And the objects of my invention are:

To provide water heating apparatus of this character in which a liquid fuel under pressure is fed to a burner located beneath the lower tank of the radiator, the fuel supply and regulating device being at all times under the control of the driver of the car or other vehicle.

Further to provide a heater of this character comprising a liquid fuel container, a burner located beneath the lower tank of the radiator, a valve-controlled pipe connecting the fuel container with the burner and means for compressing the air in the fuel container whereby the liquid fuel is expelled therefrom under suitable pressure.

Further to provide a water heater of this character having an electric ignition mechanism connected with the burner, and means whereby exhaust from the engine can be utilized to warm the burner prior to igniting the liquid fuel supplied thereto.

I attain these objects by the mechanism illustrated in the accompanying drawings in which:

Figure 1 is a side elevation of an automobile engine of a type in common use showing the application thereto of the improved water heater.

Fig. 2 is a plan view of Fig. 1.

Fig. 3 is a plan view of the bottom member of a specially constructed radiator shell showing the burner and ignition means secured thereto.

Fig. 4 is a rear view of Figure 3.

Fig. 5 is a vertical sectional view of the lower end of the fuel container showing the valve for controlling the fuel outlet thereof.

Fig. 6 is a plan view of the burner.

Fig. 7 is a transverse sectional view thereof on the line 7—7 of Figure 6.

Fig. 8 is a horizontal sectional view through the burner showing the fuel passages and the valve for controlling the supply of fuel from the inlet passage to the passages leading to the ignition point.

Fig. 9 is a vertical longitudinal sectional view of the burner, partly in elevation, the carbon arresting element in the inlet passage thereof being omitted.

Fig. 10 is a view, partly in section and partly in side elevation, of the hand pump for compressing the air in the fuel container.

Fig. 11 is a horizontal sectional view on the line 11—11 of Figure 9.

Fig. 12 is a plan view of one end portion of one of the needle valves showing the operating disk thereon, and the forked end of a valve operating rod in connection with said disk.

Fig. 13 is a perspective view of a flame shield for the burner. And

Fig. 14 is a detail view.

Similar letters of reference refer to similar parts throughout the several views.

Referring to the drawings:

The numeral 1, designates an internal combustion engine that is provided with water circulating passageways; and 2 designates a radiator of the usual type that is connected to the engine by the upper and lower water conveying pipes 3 and 4.

The radiator comprises the usual upper and lower tanks 5 and 6, respectively, which are connected by tubes in the usual manner, and the upper tank is provided with a filling neck 7, which is closed by a cap 8.

The above described combined and cooperating arrangement of engine and radiator is in common use in some form in practically all water-cooled internal-combustion motor apparatus and the improved water heating apparatus is so cooperatively positioned and connected to the radiator that it may be used not only to heat the water that circulates through the radiator and water jacket of the engine but it is designed also to keep the engine warm when the same is not running, thus preventing freezing of the water and maintaining the circulation of the same through the radiator and water jacket of the engine, so that the engine may be quickly and easily started in the coldest weather.

The water heating apparatus comprises a liquid fuel holding tank 9, a burner 10, and a hand pump 11, for maintaining a suitable air pressure in the fuel tank and these elements are constructed and arranged in the following manner:

The fuel tank 9 is preferably secured to the cylinder head of the casing on the opposite side thereof from the intake manifold, and at its forward end, by a band 12, which surrounds the tank, the free ends of which are clamped to the cylinder head by two of the bolts 13 which secure the head to the cylinder as clearly shown in Fig. 2. The band 12 is clamped tightly to the tank by a bolt 14 which passes through the ends of the band between the tank and bolts 13. This tank is of any desired capacity and its ends are closed by top and bottom caps 15 and 16. The top cap 15 is provided with a filling inlet which is closed by a screw cap 17, and also with an air inlet neck 18, which is connected by a pipe 19 with an air pump 11, which is secured to a bracket 20, which is bolted to the instrument board 21.

This pump comprises a tube or cylinder one end of which is passed through a hole in the bracket 20, and is closed by a screw cap 22; a nut 23 is threaded to the cylinder and is screwed against the opposite side of the bracket 20, from the cap 22, thus clamping the bracket between the cap 22 and nut 23, thereby rigidly securing the pump cylinder to the said bracket. A hand operated piston rod 24 passes through a hole in cap 22 and into the cylinder and is provided with a piston 25, and the forward end of the cylinder is provided with a removable nozzle 26, having a screw cap 27, in which is secured the adjacent end of the pipe 19. The end wall 28 of the nozzle is provided with a central hole 29 which opens into an air chamber 30, which is closed by the cap 27. A boss 31 is formed on the nozzle and is provided with a hole which opens into the air chamber 30, and in which is secured one end of a pipe 32, the opposite end of which extends through the bracket 20 and board 21, and has secured thereon a pressure gauge 33. The air chamber 30 is provided with a ball check valve 34 which normally closes the air hole 29 in the end wall of the nozzle, and the forward movement of the check valve, away from the hole 29, is limited by a pin 35, which extends through the nozzle as shown in Figure 10. When the piston 25, is pushed forward by the rod 24, which has a grasping knob 24$^A$, the air in advance of the piston is forced through the hole 29, into the chamber 30, and thence through the pipe 19, to the fuel tank 9. The ball 34, is moved away from the hole 29, on each forward stroke of the piston, but is forced against the hole on each reverse stroke of the piston, by air pressure from the tank 9, thus preventing back flow of air in the cylinder 11, while the pump is in operation, but the air under pressure from the tank 9, passes through the pipe 32, to the gauge 33, which is thereby caused to register the pressure in the tank 9, and this pressure can be maintained at any desired degree by the driver of the car.

In order to provide a positive means for closing the air hole 29, against back pressure, after pressure in the tank 9, has been raised to the required degree, the forward end of the piston rod or stem 24, is extended a short distance beyond the piston 25, and pointed to form a needle valve Y, which is adapted to be inserted and held in the hole 29. To accomplish this, the cap 22, is formed with an internally threaded nipple 22$^A$, and the piston rod is formed with a threaded enlargement 24$^B$, which, when screwed into the nipple 22$^A$, by turning the knob 24$^A$, forces the needle valve Y, into the hole 29, and tightly closes the same. By turning the piston rod so as to disengage the threaded enlargment 24$^B$, from the nipple 22$^A$, the rod can be reciprocated to force air into the tank 9.

The tank 9, is supplied with any suitable liquid fuel, such as gasoline, or gasoline and kerosene in suitable proportions, and the bottom cap 16, of the tank is provided with a short, internally threaded neck 36, in which is screwed a cup-like cap 37, provided with a valved outlet, which is arranged as follows: The upper end of this cap, which screws into the neck 36, is provided with a horizontal screen or strainer 38, which prevents any foreign substance in the fuel from passing down into the cap, and the cap is provided on diametrically opposite sides with nipples 39 and 40, respectively.

The nipple 39, is the outlet nipple and communicates with the interior of the cap by a conical outlet hole or valve seat 41, into which projects the conical end of a needle valve 42, a portion of which, near its opposite end, is threaded and is screwed into a threaded hole in the nipple 40. A cap 43, is screwed upon the nipple 40, and forms therewith a packing box, and the outer end portion of the needle valve 42, passes through a hole in this cap and is provided with a disk 44, having oppositely arranged holes through which passes loosely the forked end 45, of a valve operating rod 46, the opposite end of which passes loosely through an opening in the lower end of the bracket 20. By turning the rod 46, the needle valve 42, can be adjusted with respect to the outlet opening 41, to permit the outflow of the fuel, or to close the said opening and cut off the supply of fuel to the burner, as may be desired.

The nipple 39, is provided with a screw cap 47, having a central hole in which is screwed one end of a pipe 48, which connects the fuel tank with the burner 10, which is arranged and constructed as follows: The lower or base member 49, of the radiator frame or shell is especially constructed to accommodate the burner, and comprises a front wall 50, having an opening 51, through which the outer end of the crank shaft passes, a rear wall 52, and bottom portions 53 and 54, which incline downwardly from opposite ends of the member for a suitable distance and terminate in a raised central portion 55, beneath which the outer end portion of the crank shaft passes. The lower tank 6, of the radiator rests in the base member 49, the bottom of this tank being a short distance from the said raised bottom portion 55, of the base member, and the burner 10, is supported in the front and rear walls of the base member between the inclined bottom portion 54, of the base, and the bottom of the tank 6, as will be clearly understood by reference to Figures 3 and 4.

The burner 10 comprises a cylindrical body portion 56, having an opening 57 in its lower end and from its upper end extends a substantially semi-spherical member 58 which terminates in a relatively wide horizontally disposed flange 59. Within the semi-spherical member 58, and spaced from the same, is a semi-spherical bowl 60, and this bowl and the member 58 are integrally connected by a horizontal tubular member 61, which extends across the interior of the bowl and beyond opposite sides of the member 58; the said member 58, the bowl 60, the tubular member 61, and the flange 59, forming a single integral casting, as is most clearly shown in Figs. 8 and 9.

One end portion of the tubular member 61 extends through a hole in the front wall of the base 49 and is provided with a flange 62, which bears against the inner face of the said front wall and is secured thereto by screws 63 which extend through holes in the said front wall and flange. The opposite end portions of the tubular member 61 rests in a slot 6^A in the rear wall of the said base 49. The end of the tubular member adjacent to the flange 62 is closed by a screw cap 64 and a bore 65 extends in from this end of the tube for about one third of the length of the tube and terminates in a hole or valve seat 66, which in turn opens into a bore 67, which extends out through the opposite or inner end of the tube. The inner end portion of the bore 65 is threaded, and receives the threaded portion of a needle valve 68, having a pointed end which extends into the hole or valve seat 66. The opposite end of this needle valve extends through a hole in the cap 64 and is squared so that it can be turned to regulate the flow of fuel through the hole 66.

Parallel with the bore 67, and on opposite sides of the same, are passages 69, which open at one end into the bore 65 adjacent to the valve seat 66. The opposite ends of these passages terminate in downwardly and inwardly extending passages 70 which merge in a common passage 71 which is formed partly in an enlargement 72, on the wall of the body of the burner, and partly in an integral stem 73 which extends a short distance below the lower end of the body and terminates in a right angled member 74 which terminates below the central hole 57, in the lower end of the body of the burner. The passage 71 is drilled from the lower end of the stem 73, and the lower end of this passage is closed by a screw 75, and this passage is intersected by a similar passage which is drilled in from the end of the right angled member 74.

On the end of the member 74 is brazed a tip 76, through which a fine vertical hole is drilled, and the lower end of the hole is closed by a screw 77.

A passage 78 is drilled into the inner end of the tubular member of the burner, parallel with the bore 67 therein, and this end of the tubular member is closed by a screw cap 79, which closes both the bore 67 and the adjacent end of the passage 78. The inner end of the passage 78 opens into a nipple 80, in which is secured the opposite end of the pipe 48, which extends from the fuel outlet of the tank 9.

Within the passage 78, is inserted a roll of fine screen material 81, which does not interfere with the passage of fuel through the said passage, but prevents back fire through the pipe 48. Within the bore 67, is also placed a suitable carbon arrester 82, such as a piece of wire rope, which can be removed and cleaned whenever a quantity of carbon has collected thereon. The fuel passes through the tank 9, through the pipe 48, to the passage 78, thence through the bore 67, to the hole 66, which is controlled by the needle valve 68, and into the bore 65, whence it passes through the passages 69, 70 and 71, where it becomes thoroughly volatilized, and flows from the tip 76, where it is ignited in a manner to be presently described, in the form of gas. The gas from the tip enters the hole 57, in the bottom of the body of the burner, and the flame strikes the bottom of the bowl 60, whence it passes up through the space between the said bowl and the semi-spherical member 58, and contacts with the bottom of the radiator tank 6.

In order to confine the flame from the burner to the space beneath the radiator tank 6, and between the front and rear walls of the base 49, and thus prevent it from passing out between the wall of the base and the sides of said tank, I provide a shield 10$^A$, comprising a flat metal plate, the side edge portions of which are bent over at right angles and provided with screw holes, as shown in Figure 13. These bent-over edge portions fit snugly between the front and rear walls 50 and 52, of the base, and are secured thereto by screws. The horizontal portion of the shield rests against the bottom of the tank 6, and is provided with numerous holes, as shown, so as to permit the flame from the burner to contact directly with the said bottom of the tank.

The flame from the burner heats that portion of the rear wall 52, of the base immediately behind it to a high degree, and to prevent damage from this highly heated portion of the said wall, I provide the following means: Upon the rear wall 52, and the rear of the burner 10, I secure a metal plate 10$^B$, of the form shown clearly in Figure 4, the said plate extending down to the level of the lower edge of the front wall 50, and between this plate and the wall 52, is interposed a sheet of asbestos 10$^C$, the asbestos being clamped between the plate and wall by screws 10$^D$, which enter screw holes in the rear wall, and also extend through the adjoining bent edge of the shield 10$^A$, thus securing the edge of the shield to the wall 52.

The slot 6$^A$, in the wall 52, in which the rear portions of the burner tube 61 rest, is closed in the following manner, to prevent the escape of the flame therethrough: The portion of metal 6$^B$, which is cut out of the rear wall to make the slot 6$^A$, is riveted to a square plate 6$^C$, the lower edge of the piece 6$^B$, and of the plate 6$^C$, being formed with semi-circular recess as shown, to fit over the tube 51. The piece 6$^B$, is placed in the slot 6$^A$, the plate 6$^C$, resting against the rear face of the wall 52, and the said plate 6$^C$, is held between the said wall and the plate 10$^B$, thus supporting the piece 6$^B$, in the slot 6$^A$, and thereby tightly closing the same against the escape of flame.

In order to warm the burner prior to igniting the fuel, the following means are employed: Surrounding the body of the burner and spaced therefrom is a jacket 83, which conforms to the contour of the said body. The bottom of this jacket has a central opening in which fits a circular offset 84 formed on the bottom of the burner body, and the upper edge of the jacket bears against the under side of the flange 59, of the said burner, and the jacket is held to the burner by bolts 85, which extend down through the said flange 59, and through the bottom of the jacket and receive nuts 86. The jacket is provided with a horizontal partition 87, which divides the space between the jacket and the body of the burner into upper and lower chambers 88 and 89, respectively. A short pipe 90, is screwed into the bottom portion of the forward end of the exhaust manifold 91, of the engine, to the free end of which an ordinary cut-off valve 92, is screwed, and the stem of this valve is provided with a disk 93, similar to the disk 44, on the needle valve 42, of the fuel tank 9. The disk is provided with oppositely positioned holes in which fits loosely the forked end of an operating rod 94, which extends back through the dash within convenient reach of the driver of the car, and is provided with a handle. One end of a pipe 95, enters the lower end of the valve 92, and its opposite end is secured in an inlet hole in the burner jacket 83, above the partition 87. An opening 96, is formed in this partition on the opposite side from where the pipe 95, enters the jacket, and an outlet pipe 97, extends from the bottom of the jacket and lies alongside the depending stem 73, to the horizontal portion 74, of which the burner tip 76, is brazed. From the foregoing, it will be seen that by opening the valve 92, by means of the operating rod 94, a portion of the exhaust from the manifold 91, passes through the pipe 95, to the upper chamber 88, surrounding the burner, and thence through the opening 96, in the partition 87, to the lower chamber 89, and out through the pipe 97, to the atmosphere. In this way the burner may be thoroughly heated prior to lighting the same, when the engine is to be shut down for any length of time, the heating of the burner facilitating the ignition of the fuel at the burner tip.

The ignition is accomplished in the following manner: The rear wall of the base 49, of the radiator frame is formed with a bearing hub 98, which extends through a hole 10$^E$, in the plate 10$^B$, in which is inserted the core or porcelain portion 99, of an ordinary spark plug, the spark point of its electrode being immediately above the opening in the burner tip. An electrode 100, in the form of a piece of wire is secured to the raised bottom portion 55, of the base, so as to be grounded thereto, its free end being in line with the spark point of the plug electrode, but spaced therefrom to form a gap between the two points.

A current wire X, extends from the plug electrode to one terminal of an ordinary vibrator coil X$^1$, and a wire X$^2$, connects with the other terminal of the coil, and extends to one pole of a battery B, a wire X$^3$, extending from the other pole of the battery, and is grounded to the frame, preferably to the base 49; an ordinary switch X$^4$, being interposed in the wire X$^2$, to open and close the circuit through the plug. The coil and its connections are illustrated diagrammatically in Figure 2.

In practice, the needle valve 68, is adjusted to properly control the flow of fuel to the burner tip, thus regulating the fuel supply to the desired heat requirements, and when it is desired to start the heating of the water in the lower radiator tank 6, the valve rod 94, is turned to open the valve 92, and admit exhaust to the space surrounding the burner, to heat the same so that the fuel will more readily volatilize; the valve rod 46, is then operated to turn the needle valve 42, to open the outlet 41, which permits the fuel to flow through the pipe 48 to the burner as previously described. The fuel is then ignited as above set forth and the flame passes up through the hole 57, and around the bowl 60, of the burner, into contact with the bottom of the lower tank 6, the heat from the flame passing over the raised bottom 55, of the base 49, along the bottom of the tank 6, the raised bottom having an upward inclination from its side adjacent to the burner, which facilitates the passage of the heat and the portion 54, of the bottom of the base 49, has an opening 4A, directly below the burner, which permits a draft of air up through the base and beneath the bottom of the tank 6. The bottom portion 53, of the base is provided with holes 3A, which prevent water from collecting in this portion of the base.

In order to give the burner an initial heating, thereby to enable the engine to be started after the same has remained shut down for a considerable period, particularly in starting up on a very cold morning, I employ the following means: Beneath the horizontal member 74, of the burner, which terminates in the tip 76, is positioned a pan 7A, which is preferably stamped out of sheet metal of such dimensions as to form a pan of about an inch and a quarter in length by an inch in width, with a depth of one-eighth of an inch. This pan is secured to the burner by the screws 75 and 77, which pass through holes in the bottom of the pan, and into the burner, as before described. The pan is filled with wood alcohol through an opening 7B, shown in dotted lines in Figure 4, which, when admitted, heats the burner to such a degree that the liquid fuel passing therethrough is volatilized and passes out through the tip 76, in the form of gas. A curved wire screen 4B, is secured to the base 49, below the hole 4A, and this screen breaks the force of the air draft through the hole 4A, and prevents extinguishing of the burner flame.

Having described my invention, what I claim as new and desire to secure by Letters Patent, is:—

1. In a heating device of the character described, the combination with an automobile engine and a water circulating system connected therewith, including a radiator having a lower reservoir, of a burner supported beneath the reservoir having a fuel regulating valve, a fuel tank, a pipe connecting the same with the burner, a valve for controlling the outlet from said tank, means for compressing the air in said tank, a gauge connected with the tank to indicate the pressure therein, and means for delivering exhaust from said engine to the burner for heating the same prior to igniting the fuel.

2. In a heating device of the character described, the combination with an automobile dash, the engine, and a water circulating system connected therewith, including a radiator, of a burner supported beneath the radiator, a fuel tank, a valve for controlling the outlet thereof, a pipe connecting said outlet with the burner, a needle valve in said burner for controlling the flow of fuel therethrough, a pump for compressing the air in the fuel tank, a pipe connected to said pump and communicating with the tank and a pressure gauge on said pipe, means operated from the dash for controlling the outlet valve of said tank, means for conveying exhaust from the engine to heat the burner, and means operated from the dash for controlling the said exhaust supply to the burner.

3. In a heating device of the character described, the combination with an engine and a water circulating system connected with said engine, including a radiator, of a burner beneath said radiator, means for supplying liquid fuel under pressure to said burner, and means for conveying exhaust from said engine to heat said burner.

4. In a heating device of the character described, the combination with an internal combustion engine having an exhaust manifold, and a water circulating system connected with said engine, including a radiator, of a burner supported beneath said radiator having a jacket, means for supplying liquid fuel to said burner, and means for conveying exhaust from said manifold to said burner jacket thereby to heat said burner.

5. In a water heating device of the character described, the combination with an internal combustion engine having an exhaust manifold, and a water circulating system connected therewith including a radiator, of a burner supported beneath said radiator having a surrounding jacket, means for supplying liquid fuel under pressure to said burner, a cut-off valve connected to said manifold, a pipe connecting said valve and said burner jacket, whereby exhaust from said engine may be utilized to heat said burner, means for controlling the supply of fuel to said burner, and means for controlling the flow of fuel through said burner.

6. In a water heating device of the character described, the combination with an automobile dash, the engine and its exhaust manifold, and a water circulating system connected with said engine, including a radiator, of a burner supported beneath said radiator, having a jacket, a fuel tank, a needle valve controlled outlet in said tank, an operating rod extending from said valve and supported in said dash, a pipe connecting said outlet and said burner, means for compressing the air in said fuel tank, a valved outlet in said manifold, a pipe connecting said outlet and said burner jacket, thereby to convey the exhaust to said jacket to heat said burner, an operating rod extending from said exhaust outlet valve and supported in said dash, and a sparking means adapted to be connected in circuit with an electric source, for igniting said fuel at said burner.

7. In a water heating device of the character described, the combination with an automobile dash, the engine, and a water circulating system connected therewith, including a radiator, of a burner supported beneath said radiator, a fuel tank secured upon said engine, having a screened outlet, a needle valve for controlling said outlet, a pipe connecting said outlet and said burner, an operating rod extending from said needle valve and supported in said dash, an air inlet nipple on said tank, a pump supported in said dash, an air pipe connecting said pump and nipple, a check valve in said pump, a pressure gauge in said dash, a pipe extending from said pump between the check valve and the air pipe, and connected with said pressure gauge, means including a valve for conveying exhaust from said engine to said burner to heat the same, and an operating rod extending from said valve and supported in said dash.

8. In a device of the character described, the combination with an automobile engine, the radiator having a lower tank, a circulating system connecting said engine and radiator and the lower frame member of said radiator, of a burner supported in said frame member, means for supplying fuel under pressure to said burner, a needle valve in said burner for controlling the flow of fuel therethrough, sparking elements on said lower frame member adapted to be connected in circuit with an electric source for igniting the fuel at said burner, and a valve controlled pipe for conveying exhaust from said engine to said burner to heat the same.

In testimony whereof I affix my signature in presence of two witnesses.

JAMES E. ROBISON.

Witnesses:
G. SARGENT ELLIOTT,
ELIZABETH SMITH.